(12) United States Patent
Tanaka

(10) Patent No.: US 6,246,857 B1
(45) Date of Patent: Jun. 12, 2001

(54) IMAGE FORMING APPARATUS

(75) Inventor: Toshiaki Tanaka, Saitama-ken (JP)

(73) Assignees: Kabushiki Kaisha Toshiba, Kawasaki; Toshiba Tec Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/414,169

(22) Filed: Oct. 8, 1999

(30) Foreign Application Priority Data

Nov. 24, 1998 (JP) .................................................. 10-322849

(51) Int. Cl.⁷ ................................................... G03G 15/01
(52) U.S. Cl. ............................................................ 399/301
(58) Field of Search .................................... 399/301, 298, 399/299, 306; 347/116; 358/300

(56) References Cited

U.S. PATENT DOCUMENTS

| | | | |
|---|---|---|---|
| 4,916,547 | 4/1990 | Katsumata et al. | 358/300 |
| 5,072,244 | 12/1991 | Aoki et al. | 346/160 |
| 5,854,958 | 12/1998 | Tanimoto et al. | 399/49 |

FOREIGN PATENT DOCUMENTS

| | | |
|---|---|---|
| 7-019084 | 1/1995 | (JP) . |
| 8-248723 | 9/1996 | (JP) . |
| 8-248730 | 9/1996 | (JP) . |
| 2603254 | 1/1997 | (JP) . |
| 9-204087 | 8/1997 | (JP) . |

*Primary Examiner*—Quana M. Grainger
(74) *Attorney, Agent, or Firm*—Foley & Lardner

(57) ABSTRACT

A color copying machine has 4 color image forming units arranged at equal spaces along a first direction above a conveyor belt endlessly running in the first direction. Images formed by the image forming units are superimposed and a color images is formed on a paper that is conveyed by the conveyor belt. When correcting misregistration of colors, wedge shaped marks formed on the conveyor belt are detected by sensors and correction amounts based on the detection result are set up. Then, the correction control is executed based on the correction amounts. Further, a straight line mark extending in the second direction orthogonal to the first direction is formed and color misregistration caused by secular speed change of the conveyor belt by the effect of radiant heat is corrected. In this case, a correction amount is changed based on the straight mark detection result.

27 Claims, 6 Drawing Sheets

IMAGE FORMING APPARATUS

BACKGROUND OF THE INVENTION

1. Field of the Invention

The present invention relates to an image forming apparatus that is usable in a color printer, a color copying machine, etc., capable of forming images in color components through a plurality of image forming stations and further, capable of forming a color image by superimposing these images on a paper.

2. Description of the Related Art

As an image forming apparatus, a color copying machine that has an endless running conveyer belt and a plurality of image forming stations in different colors provided in parallel with the conveyer belt is known. In this copying machine, a paper is adsorbed on the conveyer belt and an image is formed on that paper by superimposing images in different colors through color image forming stations.

In this kind of color copying machine, it is regarded extremely difficult to bring the running speed of a conveyer belt accurately in accord with the process speed at each image forming station and superimpose images in different colors on a paper by adjusting an image forming timing at each image forming station. The process speed referred to here is a rotary speed of a photosensitive drum in a process unit wherein, for instance, a toner image is formed.

In view of this, in case of conventional color copying machines, when a power source of an apparatus is turned ON or in the reset operation after completing this jam processing, test patterns in different colors are formed on a conveyer belt through image forming stations. Based on a timing to detect this test pattern, an amount of misregistration of an image forming position by each image forming station is detected. Based on this amount of misregistration, an image forming timing at each image forming station is adjusted so as to correct the misregistration of a color of image formed on a paper.

As disclosed in U.S. Pat. No. 5,854,958 (Dec. 29, 1998), some of patterns for correcting misregistration are, for instance, wedge shaped patterns that have a first segment of a line extending in the main scanning direction orthogonal to the running direction of a conveyer belt and a second segment extending inclining from one end of this first segment of a line. These wedge shaped test patterns in different colors are formed outside the image forming area in line at equal spaces along the running direction of a conveyer belt, that is, the sub-scanning direction. Then, these test patterns are detected in order through sensors provided opposing to the conveyer belt at the further downstream side than a plurality of image forming stations. Based on these test pattern detecting timings, amount of misregistration of image forming positions by the image forming stations is adjusted and the misregistration of a color is corrected.

However, in said conventional color copying machine, a fixing device is arranged close to one of rollers over which a conveyer belt is put. When affected by the radiant heat from this fixing device, the roller diameter is secularly expanded by heat. If the roller diameter is expanded secularly, the running speed of the conveyer belt gradually increases causing color misregistration on color images that are superimposed on a paper.

That is, when the roller diameter becomes large by, for instance, A mm by the thermal expansion, the length of the outer circumference becomes large by A×3.14 mm. As a result, the peripheral speed of the roller, that is, the running speed of the conveyer belt also becomes fast. So, assuming that the change amount of length of the outer circumference of the roller is ΔL, the number of revolutions of the roller until it passes through a plurality of image forming stations is N, the atmospheric temperature rise near the roller is ΔT, a coefficient of thermal expansion of the roller is K, the roller diameter before expansion is R, a distance from the image forming station at the most upper stream side to the image forming station at the most downstream side is D, the maximum value O of the relative misregistration of each color image is:

$$O = \Delta L \times N = \Delta T \times K \times R \times D / (R \times \pi)$$

a ratio of the misregistration against the degree of expansion of the roller diameter becomes very high.

To prevent the misregistration of colors caused by secular thermal expansion of the roller diameter, for instance, a method to detect and correct the misregistration of colors for each sheet of paper by forming a plurality of wedge shaped test patterns as mentioned above by expanding a space between a preceding paper and a succeeding next paper is considered.

In this method, however, as a space between a preceding paper and a succeeding next paper is expanded, the number of sheets of paper supplied for the image forming in a unit time becomes less and the processing speed of the entire apparatus becomes slow. Further, the sequential process due to the interruption for forming a test pattern will become necessary and the processing speed of the entire apparatus will become further slow. In addition, there may be generated a problem that troubles relative to the sequential process are produced and the quality is lowered.

SUMMARY OF THE INVENTION

It is an object of the present invention to provide an image forming apparatus that is capable of preventing the misregistration of colors of an image caused by the fluctuation of the moving speed of the conveyer belt affected by radiant heat from a fixing device without lowering the processing speed of the apparatus.

According to the present invention, an image forming apparatus for forming superimposed images is provided. The image forming apparatus comprises a plurality of image carriers arranged along a first direction; conveying means for conveying an image receiving medium along said plurality of image carrier; a plurality of image forming means for transferring images formed on said plurality of image carriers onto the image receiving medium conveyed by said conveying means; first mark forming control means for controlling said image forming means so as to form a plurality of first marks on said conveying means by said plurality of image forming means; detecting means for detecting a first misregistration of images formed by said plurality of image forming means in the first direction and a second direction orthogonal to the first direction by detecting locations of the plurality of first marks formed on said conveying means; first image forming control means for controlling at least one of said conveying means and said plurality image forming means according to the first misregistration detected by said detecting means; second mark forming control means for controlling said image forming means so as to form a second mark simpler than the first marks on said conveying means by one of said plurality of image forming means; and second image forming control means for detecting a second misregistration of the second mark in either the first direction or the second direction to control at least one of said conveying means and said plurality of image forming means according to the second misregistration.

DETAILED DESCRIPTION OF THE PREFERRED EMBODIMENTS

Preferred embodiments of the present invention will be described below referring to the attached drawings.

Figure 1:
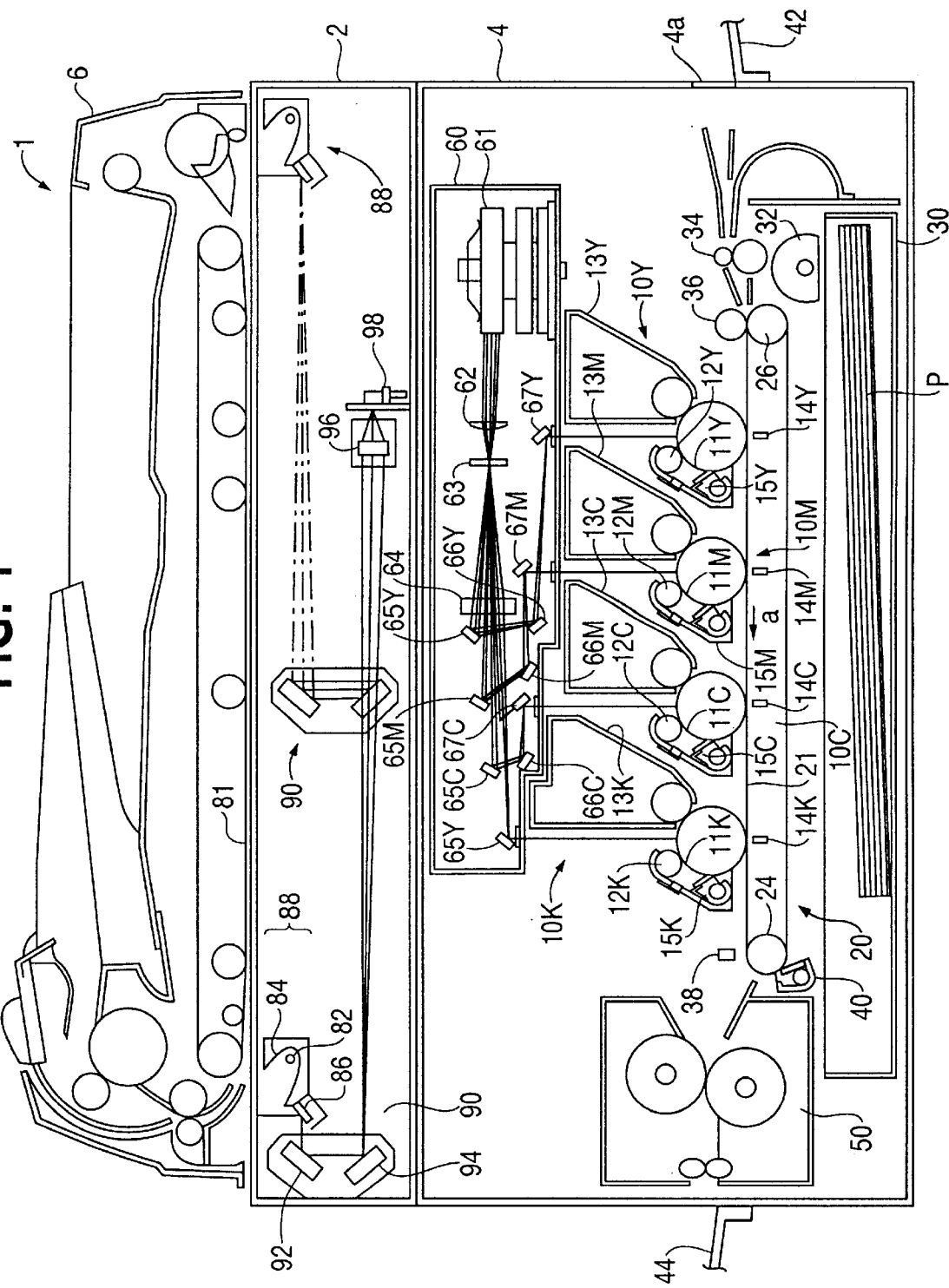
FIG. 1 is a sectional view schematically showing an image forming apparatus of an embodiment of the present invention.
Figure 2:
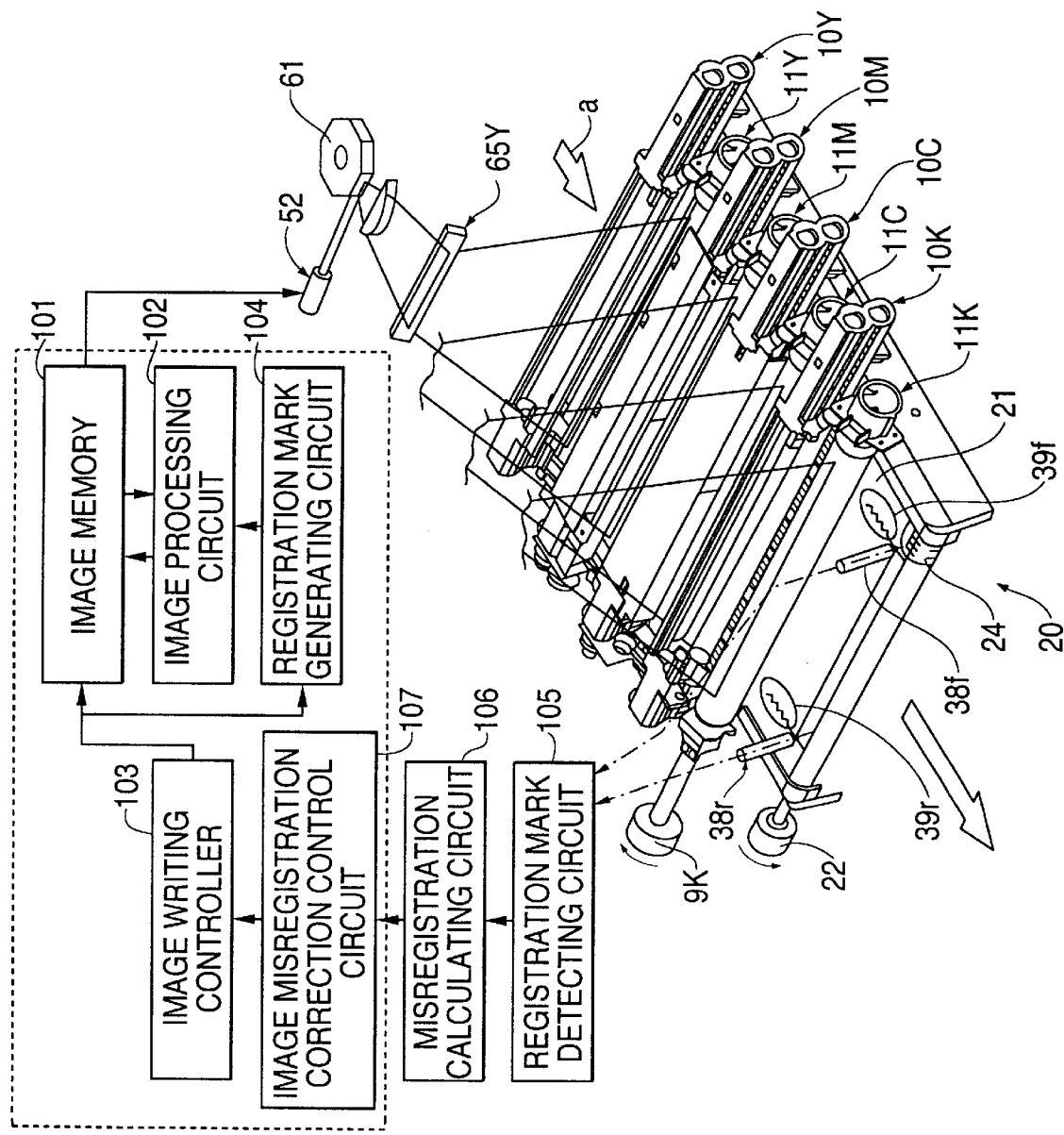
FIG. 2 is a diagram showing a perspective view of the essential portions of the image forming apparatus shown in FIG. 1 combined with a block diagram of its control system.

FIG. 1 shows a sectional view of a transfer type color digital copying machine 1 (hereinafter referred to simply as a copying machine 1) as an image forming apparatus of the present invention and FIG. 2 shows the schematic structure of the essential portions of the copying machine 1 and its control system.

As shown in FIG. 1, the copying machine 1 is provided with a scanner portion 2 to read image data of a document and a printer portion 4 to form an image based on the read image data. On the top of the scanner portion 2, an automatic document feeder 6 (hereinafter referred to simply as ADF 6) is set.

The ADF 6 is mounted on the scanner 2 and can be opened/closed against a document table (described later) on the scanner portion 2. The ADF 6 feeds objects to be read, that is, documents to the document table one by one and also functions as a document cover to closely fit the documents placed on the document table thereto.

The printer portion 4 has a first through a fourth image forming units 10Y, 10M, 10C and 10K which form images in different colors based on color separated image data for each color component, that is, yellow (hereinafter shown as Y), magenta (a kind of red, hereinafter shown as M), cyan (a bluish purple, hereinafter shown as C) and black (hereinafter shown as K). Below the image forming units 10Y, 10M, 10C and 10K, there is provided a conveyer mechanism 20 that conveys a paper through the image forming units. The conveyer mechanism 20 has a conveyer belt 21 that conveys a paper in the arrow direction a in the drawing. As shown in FIG. 2, the conveyer belt 21 is put over and stretched between a driving roller 24 that is rotated by a belt motor 22 and a driven roller 26 that is separated at a specific distance from the driving roller 24, and runs endlessly in the arrow direction a.

The image forming units 10Y, 10M, 10C and 10K have photosensitive drums 11Y, 11M, 11C and 11K of which outer circumferences are formed rotatably in the same direction at the location in contact with the conveyer belt 21. The photosensitive drums 11Y, 11M, 11C and 11K are connected with drum motors 9Y, 9M, 9C and 9K to rotate the photosensitive drums at a specified peripheral speed (in FIG. 2, 9K only is shown to simplify the illustration).

The shaft lines of the photosensitive drums 11Y, 11M, 11C and 11K are extending in the direction orthogonal to the running direction (the arrow direction a) of the conveyer belt 21 and are arranged at equal spaces. Further, in the explanation shown below, the shaft lines of the photosensitive drums are regarded as the main scanning direction (the second direction) and the rotating direction of the photosensitive drums, that is, the running direction of the conveyer belt 21 (the arrow direction a in the drawing) is regarded as the sub-scanning direction (the first direction).

Around the photosensitive drums 11Y, 11M, 11C and 11K, there are arranged charging rollers 12Y, 12M, 12C and 12K, developing devices 13Y, 13M, 13C and 13K, transfer devices 14Y, 14M, 14C and 14K and cleaners 15Y, 15M, 15C and 15K in order along the rotating directions of corresponding photosensitive drums. Further, the transfer devices 14Y, 14M, 14C and 14K are arranged at locations interposing the conveyer belt 21 between corresponding photosensitive drums, that is, inside the conveyer belt 21. Further, exposure points of exposure devices (that will be described later) are formed on the outer circumferences of the photosensitive drums between the charging rollers 12Y, 12M, 12C and 12K and the developing devices 13Y, 13M, 13C and 13K.

Below the conveyer mechanism 20, there is arranged a paper feed cassette 30 containing a plurality of paper P as transfer media on which images formed by the image forming units 10Y, 10M, 10C and 10K are transferred.

At one end of the paper feed cassette 30 and the side close to the driven roller 26, there is provided a pick-up roller 32 which picks up sheets of paper P one sheet at a time from the top. Between the pick-up roller 32 and the driven roller 26, there is arranged an aligning roller 34 which is to align the leading edge of the paper P taken out of the paper feed cassette 30 with the leading edge of a Y toner image formed on the photosensitive drum 11Y of the image forming unit 10Y arranged at the most upper stream side. Further, toner images (M, C and K) formed on other photosensitive drums 11Y, 11M and 11C are supplied to respective transfer positions conforming to the conveying timing of paper P that is adsorbed on the conveyer belt and conveyed.

On the outer circumference of the driven roller 26 interposing the conveyer belt 21 between the aligning roller 34 and the first image forming unit 10Y, an adsorbing roller 36 is arranged. The adsorbing roller 36 gives a specific electrostatic adsorbing force to paper P conveyed at a specified timing through the aligning roller 34 and adsorbs paper P to the conveyer belt 21.

On the outer circumference of the driving roller 24 interposing the conveyer belt 21 at one end of the conveyer belt 21, a pair of sensor 38f and 38r for detecting a pattern image that is formed on the conveyer belt 21 are arranged separating at a specified distance from the driving roller 24. The sensors 38f and 38r are composed of permeable or reflecting type optical sensors. Further, the four photosensitive drums 11Y, 11M, 11C and 11K, and sensors 38f and 38r are arranged at equal spaces along the running direction of the conveyer belt 21.

On the outer circumference of the driving roller 24 and on the conveyer belt 21 at the downstream side of the sensors 38f and 38r, a belt cleaner 40 is arranged. The belt cleaner 40 removes toners and refuse of paper P adhered on the conveyer belt 21.

In the direction where paper P conveyed by the conveyer belt 21 is separated from the driving roller 24 and further conveyed, a fixing device 50 is arranged. The fixing device 50 fuses a toner transferred on the paper P by heating the paper P to a specific temperature and fixes a toner image on the paper P.

On the right side of the housing of the printer portion 4, a paper feeding port 4a is formed to manually feed a paper P and a paper supply tray 42 is provided to the paper feeding port 4a. The paper P supplied through the paper feeding port 4a is led to the aligning roller 34 and supplied to each of the image forming units. Further, on the left side of the printer portion 4, a paper receiving tray 44 is provided to receive the paper P discharged through the fixing device 50.

Further, above the image forming units 10Y, 10M, 10C and 10K, an exposure device 60 is arranged to project an optical image on the photosensitive drums 11Y, 11M, 11C and 11K. The exposure device 60 has laser generating devices for colors whose generation is controlled according to image data in separated colors (Y, M, C and K) in an image processing circuit that will be described later (the laser generation device 52 for black only is shown in FIG. 2). On the outer circumferences of the color photosensitive drums 11Y, 11M, 11C and 11K, electrostatic latent images based on color separated image data are formed by respective color laser generating devices. On the optical paths of the laser generating devices, a polygon mirror 61 to reflect and scan laser beams and a first through a third fθ lenses 62, 63 and 64 to form images by correcting the focus of laser beams reflected on the polygon mirror 61 are provided in order.

Between the third fθ lens 64 and the photosensitive drums 11Y, 11M, 11C and 11K, there are arranged first mirrors 65Y, 65M, 65C and 65K that bend color laser beams passed through the third fθ lens 64 toward the exposure positions of respective photosensitive drums. Further, second and third mirrors 66Y, 66M, 66C and 66K are arranged to further bend the laser beams that are bent by the first mirrors 65Y, 65M, 65C and 65K. Further, the laser beam for black color is guided onto the photosensitive drum 11K without passing other mirrors after being bent by the first mirror 65K.

The scanner portion 2 that reads document images has a document table 81, that is made of a transparent glass and on which a document D is set, on its top opposing to the ADF 6 that is in the closed state. Below the document table 81, there are an exposure lamp 82 to illuminate the document D placed on the document table 81, a reflector 84 to focus the light from the exposure lamp 82 to the document D and a first mirror 86 to bend the reflected light from the exposure lamp 82 to the left direction in the drawing. Further, these exposure lamp 82, reflector 84 and first mirror 86 are fixed to a first carriage 88. The first carriage 88 is connected to a pulse motor (not shown) through a toothed belt (not shown) and is moved in parallel with the document table 81 by the driving force transmitted from the pulse motor.

In the left direction to the first carriage in the drawing, that is, the direction in which the light reflected on the first mirror 86 is guided, a second carriage 90 is provided movable in parallel with the document table 81 by a driving mechanism (not shown), for instance, a toothed belt and a DC motor. The second carriage 90 is provided with a second mirror 92 to bend the reflected light from a document D guided by the first mirror 86 and a third mirror 94 that bend the reflected light from the second mirror 92 to the right direction in the drawing at a right angle to each other. The second carriage 90 is driven by the first carriage 88 and is moved in parallel with the document table 81 at a speed of ½ against the first carriage 88.

In the surface including the optical axis of the bent light from the second carriage 90, there is arranged a focusing lens 96 that focuses the reflected light from the second carriage 90 at a specified magnification. In the surface nearly orthogonal to the optical axis of the light passed through the focusing lens 96, there is arranged a CCD image sensor 98 that converts the reflected light that can be focused by the focusing lens 96 into an electric signal, that is, image data.

Thus, when the light from the exposure lamp 82 is focused on a document D placed on the document table 81 by the reflector 84, the reflected light from the document D is applied to the CCD image sensor 98 through the first mirror 86, the second mirror 92, the third mirror 94 and the focusing lens 96 and converted into image data.

Next, the operation of the copying machine 1 in the structure as described above is explained in detail.

When a power switch (not shown) is turned ON, the copying machine 1 is initialized. By this initialization, the fixing device 50 is heated to a specified temperature, the rotating speeds of the motors are stabilized and the apparatus is maintained in the standby state. Then, the document D is read by the scanner portion 2 and an image on the document D is read through the CCD image sensor 98. The read image data is once stored in an image memory 101. The stored image data is separated into respective color image data (Y, M, C and K) in an image processing circuit 102. The color separated image data are processed for magnification, rotation, movement, etc. as necessary.

Here, the Y (yellow) image forming process is explained using the first image forming unit 10Y. Further, needless to say, M (magenta) image, C (cyan) image and K (black) image are formed similarly by the second through the fourth image forming units 10M, 10C and 10K.

First, the surface of the photosensitive drum 11Y is uniformly charged by the charging roller 12Y. In succession, the laser generation of the laser generating device 52 according to the Y (yellow) image data processed in the image processing unit 102 and the laser beam based on the Y image data is applied to a specified exposure position of the photosensitive drum 11Y through the exposure device 60. As a result, a Y electrostatic latent image corresponding to the Y image data is formed on the photosensitive drum 11Y.

The Y electrostatic latent image formed on the photosensitive drum 11Y is developed to a visible image by the developing device 13Y containing Y toner and converted into a Y toner image on the photosensitive drum 11Y.

The Y toner image on the photosensitive drum 11Y is transferred on the paper P that is picked up from the paper feed cassette 30, adsorbed and aligned on the conveyer belt 21 by the aligning roller 34 at a specified timing by the transferring device 14Y at a transferring position wherein the photosensitive drum 11Y faces to the conveyer belt 21.

Hereinafter, the M toner image, C toner image and K toner image formed on the photosensitive drum 11M, 11C and 11K by the second image forming unit 10M, third image forming unit 10C and fourth image forming unit 10K are superimposed in order on the paper P conveyed by the conveyer bet 21. That is, in the case of printing in multiple colors, the image forming operation comprising one cycle of the charging, exposing, developing and transferring operations is executed and toner images in different colors are multiply transferred on the paper P.

In this case, because the photosensitive drums 11Y, 11M, 11C and 11K are arranged at equal spaces along the conveying direction of the paper P, the exposure timings of the color laser generating devices are staggered each other in order to superimpose color images on the paper P absorbed and conveyed by the conveyer belt 21.

Residual toners left on the photosensitive drums 11Y, 11M, 11C and 11K without used are cleaned by the cleaners 15Y, 15M, 15C and 15K, respectively.

The paper P carrying a multi-transferred color toner image is separated from the conveyer belt 21, conveyed to the fixing device 50 and ejected in the paper receiving tray 44 after the toner image is heated, fused and fixed on the paper P by the fixing device 50.

Further, toners adhered to the conveyer belt 21 (including a registration mark that will be described later) and paper refuse produced from paper P are removed by the belt cleaner 40.

Next, a method to detect and correct the misregistration of color images that is formed by the image forming units 10Y, 10M, 10C and 10K of the copying machine 1 is explained. Further, in the present invention, a first correction control is executed during the initializing operation when the power switch of the copying machine 1 is turned ON and during the reset operation after the jam processing, and a second correction control is executed at a specified timing other than the first correction control.

Figure 3:
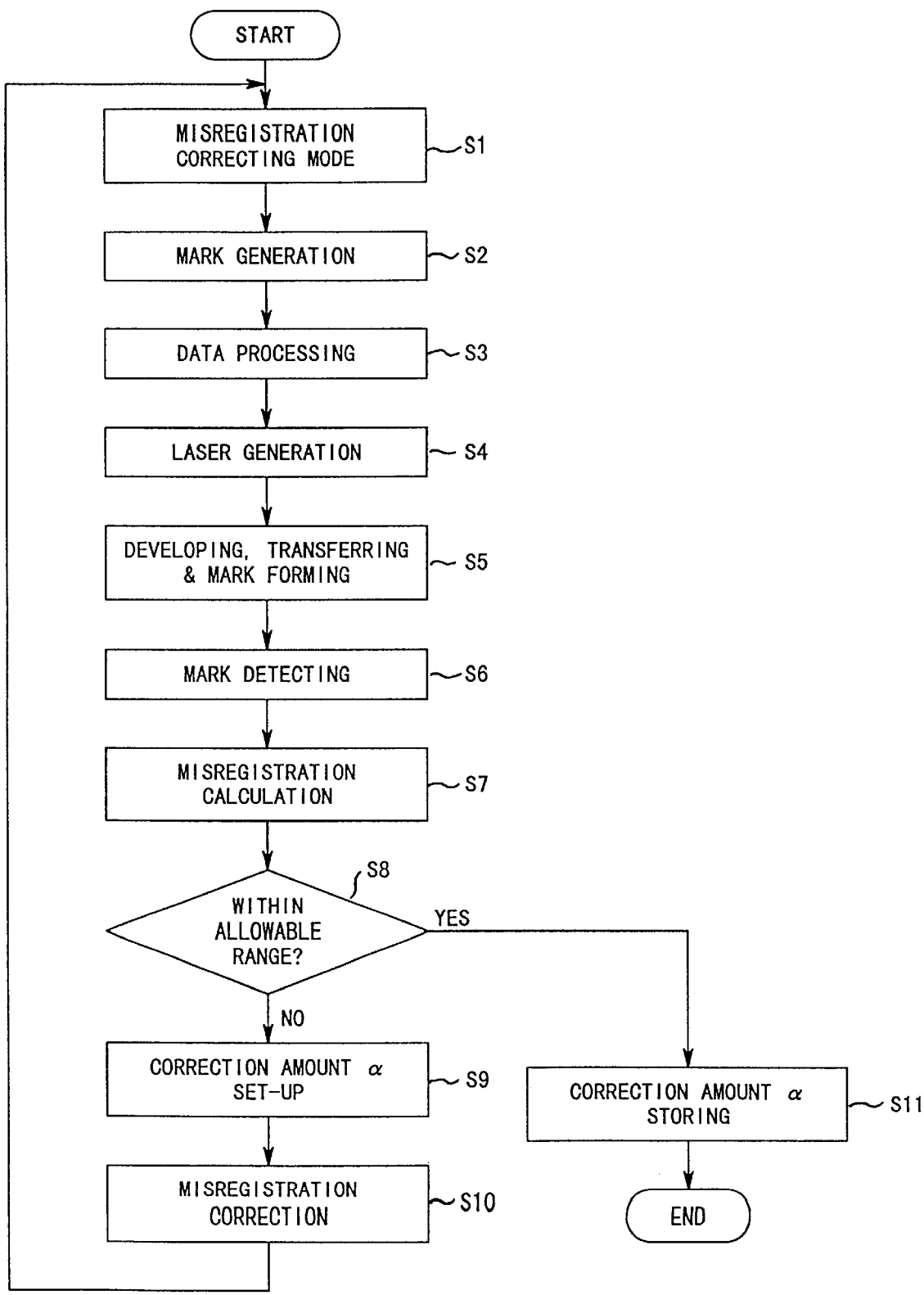
FIG. 3 is a flowchart for explaining a first color misregistration correction control operation by the image forming apparatus shown in FIG. 1.

First, the first correction control is explained referring to the flowchart shown in FIG. 3.

During the initializing operation when the power switch of the copying machine 1 is turned ON or the reset operation after the jam processing, the first correction control sequence is started. When the sequence is started, under the condition that the driving system including the belt motor 22, drum motors 9Y, 9M, 9C and 9K are stabilized, the first misregistration correction mode starts (Step 1).

When the first misregistration correction mode starts, under the control of an image writing controller 103 (hereinafter, simply referred to as the controller 103), image data relative to a wedge shaped registration mark (hereinafter, simply referred as the wedge shaped mark) is output from a registration mark generating circuit 104 (hereinafter, simply referred to as the mark generating circuit 104) (Step 2). The wedge shaped mark has a first segment extending in the main scanning direction in the state of an image transferred on the conveyer belt 21 and a second segment extending from one end of this first segment while inclined as shown in FIG. 4.

The image data relative to the wedge shaped mark output from the generating circuit 104 is input to the laser generating device 52 in each color through the image memory 101 after processed in the image processing circuit 102 (Step 3).

Figure 4:
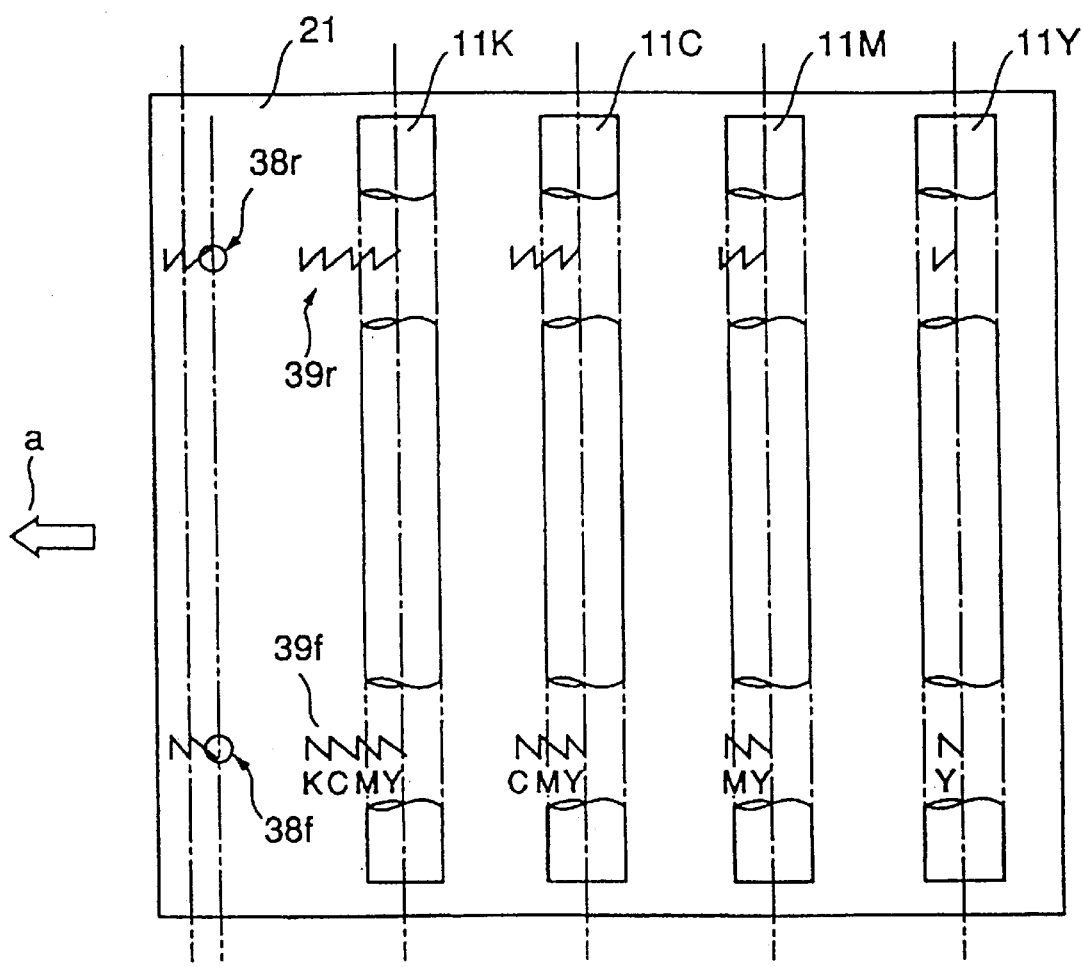
FIG. 4 is a plan view showing the state of wedge shaped registration marks in different colors formed on the transfer belts.

In the laser generating device 52 in each color, the laser generating timing is controlled so that the wedge shaped marks in each color are aligned in the sub-scanning direction at equal spaces when the wedge shaped marks in each color (Y, M, C and K) are output on the conveyer belt 21 as shown in FIG. 4, electrostatic latent images in respective colors are formed on the outer circumferences of corresponding photosensitive drums 11Y, 11M, 11C and 11K (Step 4).

The electrostatic latent images formed on the photosensitive drums 11Y, 11M, 11C and 11K are developed by the developing devices 13Y, 13M, 13C and 13K, respectively. The developed developer images are transferred on the conveyer belt 21 by the transferring devices 14Y, 14M, 14C and 14K and wedge shaped marks 39f and 39r by developers in respective colors are formed (Step 5).

The wedge shaped marks 39f and 39r in respective colors pass through the sensors 38f and 38r when the conveyer belt 21 runs and the passed timing is detected by a registration mark detecting circuit 105 (hereinafter, simply referred to as the detecting circuit 105) through these sensors 38f and 38r (Step 6). Further, the sensors 38f and 38r are arranged at the locations at the front and rear sides of the apparatus, through which the wedge shaped marks pass on the conveyer belt 21. Further, the wedge shaped marks 39f and 39r detected by the sensors 38f and 38r are cleaned every time by the belt cleaner 40 arranged at the further downstream side. Detection signals of the wedge shaped marks detected by the detecting circuit 105 are input to a misregistration calculating circuit 106 (hereinafter, simply referred to as the calculating circuit 106), wherein amounts of misregistration of the wedge shaped marks in respective colors are calculated as amounts of misregistration of output images by the image forming units 10Y, 10M, 10C and 10K (Step 7).

Further, at this time, a time required from when the yellow wedge shaped mark is transferred on the conveyer belt 21 through the yellow image forming unit 10Y until when said yellow mark is detected by the sensor 38 is measured at the same time.

Then, it is judged if the amount of misregistration calculated in Step 7 is within a preset allowable range Step 8) and if the amount of misregistration is above the allowable range (Step 8: NO), a correcting amount α to correct this misregistration is set (Step 9).

This correcting amount α is a running speed of the conveyer belt 21, a rotating speed of the photosensitive drums 11Y, 11M, 11C and 11K or a laser generating timing of each laser generating device 52, and according to this correcting amount α, the belt motor 22, the drum motors 9Y, 9M, 9C and 9K, the laser generating device 52 are controlled and an image misregistration is corrected by an image misregistration correction control circuit (Step 10).

Hereafter, the process returns to Step 2 and the processes up to Step 10 are repeated until the amount of misregistration is judged to be within the allowable range in Step 8. When the amount of misregistration is judged to be within the allowable range in Step 8 (Step 8: YES), the latest correcting amount α that is set in Step 9 is finalized and stored in a memory (not shown) (Step 11).

In the subsequent processing, each unit of the copying machine 1 is controlled and the image forming operation is carried out according to the correcting amount stored in Step 11.

Further, in the process loop from Step 2 to Step 10 until a proper amount of correction α is decided in the above-mentioned first correction control, a time t from when the wedge shaped mark is transferred on the conveyer belt 21 by the yellow image forming unit 10Y until the mark is detected by the sensors 38f and 38r is measured multiple times, and these multiple times t1–tn are averaged and a reference time T for a second correction control that is described later is obtained.

Figure 5:
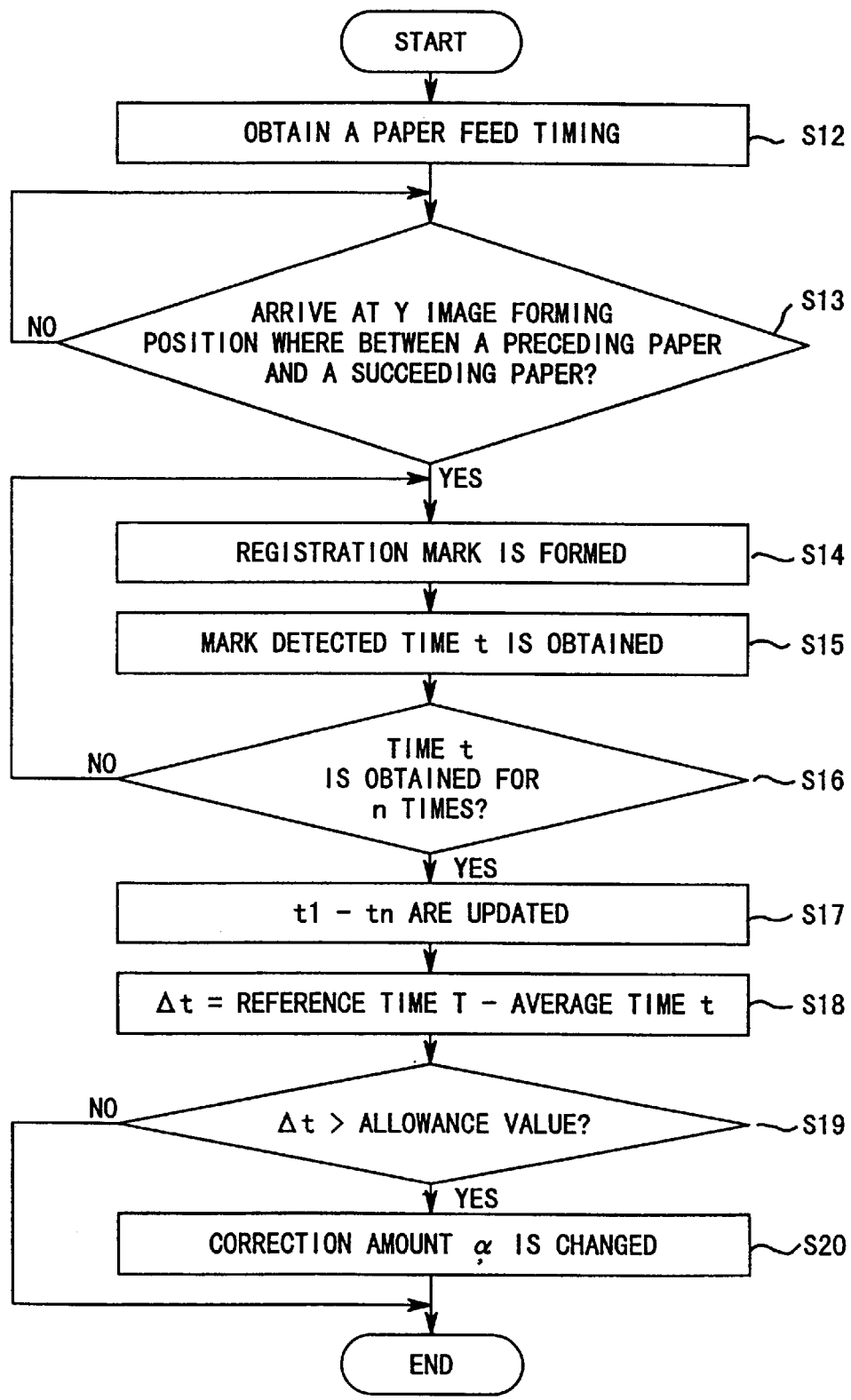
FIG. 5 is a flowchart for explaining a second correction control operation.

Next, the second correction control to correct a color distortion of color images is explained referring to a flowchart shown in FIG. 5.

The second correction control is to correct the misregistration of colors caused when the driving roller 24 is expanded by the radiant heat received from the fixing device 50, its diameter is increased and the moving speed of the conveyer belt 21 over the driving roller 24 is changed based on the above-mentioned first correction control. For example, as a control timing, (1) between preceding paper P and succeeding paper P that are continuously supplied, (2) every continuous printing task, (3) a timing at every set time are considered.

When the second control sequence is started at any timing of above (1)–(3) in the copying operation, from the operating timings of the pick-up roller 32 and the aligning roller 34 to continuously feed paper P, a paper feed timing of paper P is obtained (Step 12). And from this paper feed timing, a timing that a space between a preceding paper P and a succeeding paper P that are continuously fed passes the image forming position by the yellow image forming unit 10Y is measured. At this time, in order to promote the signal detecting resolution in this control, out of four image forming units, the Y image forming unit 10Y that is most far away from the sensors 38f and 38r is selected. That is, the Y image forming unit 10Y that is most far away from the sensors 38f and 38r is desirable as a position to detect the speed change of the conveyer belt 21 precisely.

Figure 6:
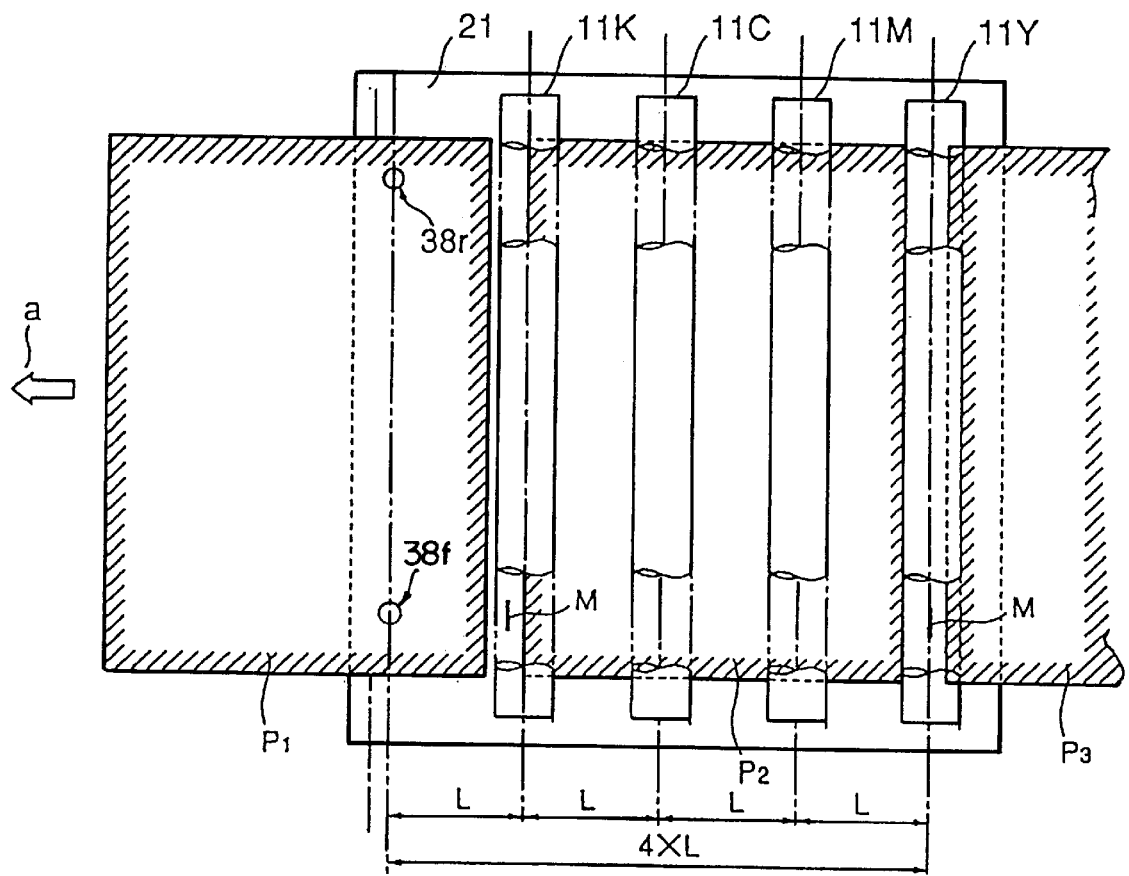
FIG. 6 is a plan view showing the state of the registration marks of the second correction control formed on the transfer belt.

And at the point of time when a space between a preceding paper and a succeeding paper arrives at the Y image forming position (Step 13: YES), a straight line shaped registration mark M (hereinafter referred to simply as a straight line mark M) is formed on the space between paper on the conveyer belt 21 as shown in FIG. 6 (Step 14). Further, when forming the straight line mark M, the processes similar to those in Step 2–Step 6 in said first correction control are executed. Further, the straight line M is formed extending along the main scanning direction.

The straight line mark M formed in Step 14 is moved when the conveyer belt 21 runs and detected by the sensors 38f and 38r. At this time, a time t required from when the straight line mark M is formed in the Y image forming unit 10Y until it is detected by the sensors 38f and 38r is obtained (Step 15). The time t is shifted according to the secular speed change of the conveyer belt 21. For example, in such a case wherein the driving roller 24 with the conveyer belt 21 is expanded as affected by the radiant heat from the fixing device 50, the running speed of the conveyer belt 21 becomes fast and the time t is also made short.

When the processes in Steps 14 and 15 are repeated and the time t is obtained for n times (Step 16: YES), the latest time data t1–tn for n times are updated (Step 17) and an average time t [avg] of t1–tn is calculated.

Then, a differential time Δt calculated by subtracting the calculated average time t [avg] from the reference time T obtained in the above-mentioned correction control (Step 18). This time Δt is judged if it is above the allowable value (Step 19). Further, this allowable value is set according to the allowable range of color distortion caused by the speed change of the conveyer belt 21.

As a result of the judgment in Step 19, when judged that the time Δt is above the allowable value (Step 19: YES), it is judged that color misregistration is cause and the above-mentioned correction amount α for correcting the color is changed (Step 20).

For example, when an average time t [avg] from the formation of the straight line mark M to its detection is shortened for 4 lines in terms of a scanning line by the polygon mirror 61, the correction amount α is changed so as to shorten the yellow image writing timing for 3 lines, the magenta image writing timing for 2 lines and the cyan image writing timing for 1 line using the image forming timing of the polygon mirror 61 as the reference. Further, a length of 1 line is, for instance, 0.1 mm.

Further, in the second correction control, the speed change for 4 lines is normally not caused suddenly and therefore, the shift of the correction amount α is generally judged by the ½ line as the reference and at the time when it exceeds the ½ line, the correction amount α is shifted for one line.

As described above, according to the color distortion correction control of the present invention, as the correction amount α that is set in the first correction control is changed as appropriate in the second correction control, the sequential process relative to the correction control of color distortion can be simplified. Therefore, a time needed for the sequential process can be reduced and the color distortion caused by the radiant heat from the fixing device also can be corrected satisfactorily.

Further, as the straight line mark M is used in the second correction control without using the wedge-shaped mark as in the first correction control, amount of a developer that is used for forming the mark can be suppressed. Furthermore, a space required for forming the mark can be reduced and the high-speed process becomes possible without reducing the number of sheets of paper to be fed in a unit time. In addition, as the straight line mark M is adopted, the sequential process can be serially processed almost without a burden in the sequential process.

Further, the present invention is not restricted to the above-mentioned embodiment but can be deformed variously within the scope of the present invention.

As described above, as the image forming apparatus of the present invention is in the structure and has actions as described above, a secular color distortion due to the effect of radiant heat can be prevented without lowering the processing speed of the image forming apparatus.

What is claimed is:

1. An image forming apparatus for forming superimposed images, comprising:

a plurality of image carriers arranged along a first direction;

conveying means for conveying an image receiving medium along said plurality of image carrier;

a plurality of image forming means for transferring images formed on said plurality of image carriers onto the image receiving medium conveyed by said conveying means;

first mark forming control means for controlling said image forming means so as to form a plurality of first marks on said conveying means by said plurality of image forming means;

detecting means for detecting a first misregistration of images formed by said plurality of image forming means in the first direction and a second direction orthogonal to the first direction by detecting locations of the plurality of first marks formed on said conveying means;

first image forming control means for controlling at least one of said conveying means and said plurality image forming means according to the first misregistration detected by said detecting means;

second mark forming control means for controlling said image forming means so as to form a second mark simpler than the first marks on said conveying means by one of said plurality of image forming means; and second image forming control means for detecting a second misregistration of the second mark in either the first direction or the second direction to control at least one of said conveying means and said plurality of image forming means according to the second misregistration.

2. An image forming apparatus for forming superimposed images according to claim 1, wherein each of the first marks is a wedge shaped mark formed by a first straight line extending in the second direction orthogonal to said first direction and a second straight line that is not in parallel with the first straight line and is crossing the first straight line at a specified angle.

3. An image forming apparatus for forming superimposed images according to claim 1, wherein the second mark is a single straight line extending in the second direction orthogonal to said first direction.

4. An image forming apparatus for forming superimposed images according to claim 3, wherein said second mark forming control means controls to form said second mark on the conveying means between a preceding image receiving medium and a succeeding next image receiving medium continuously conveyed by said conveying means.

5. An image forming apparatus for forming superimposed images, comprising:
  a plurality of image carriers arranged along a first direction;
  conveying means for conveying an image receiving medium along said plurality of image carrier;
  a plurality of image forming means for transferring images formed on said plurality of image carriers onto the image receiving medium conveyed by said conveying means;
  first mark forming control means for controlling said image forming means so as to form the first mark on said conveying means by said plurality of image forming means;
  detecting means for detecting misregistration of images formed by said plurality of image forming means by detecting locations of a plurality of marks formed on said conveying means by said first mark forming control means;
  set-up means for setting up a correction amount to correct the misregistration detected by said detecting means;
  first image forming control means for controlling at least one of said conveying means and said plurality image forming means according to the correction amount set up by said set-up means;
  second mark forming control means for controlling said image forming means so as to a second mark differing from said first mark on said conveying means by one of said plurality of image forming means; and
  second image forming control means for changing the correction amount set up by said set-up means according to the amount of misregistration from a reference time by comparing a time required from when said second mark is formed on said conveying means by said second mark forming control means until it is conveyed to a specified location with said reference time.

6. An image forming apparatus for forming superimposed images according to claim 5, wherein said second image forming control means controls to change a correction amount relative to the moving speed of said conveying means out of the correction amounts set up by said set-up means.

7. An image forming apparatus for forming superimposed images according to claim 5, wherein the mark formed by said first mark forming control means is a wedge shaped mark formed by a first straight line extending in a second direction orthogonal to said first direction and a second straight line that is not in parallel with the first straight line and is crossing the first straight line at a specified angle.

8. An image forming apparatus for forming superimposed images according to claim 5, wherein the mark formed by said second mark forming control means is a single straight line extending in the second direction orthogonal to said first direction.

9. An image forming apparatus for forming superimposed images according to claim 8, wherein said second mark forming control means controls to form said second mark on the conveying means between a preceding image receiving medium and a succeeding next image receiving medium continuously conveyed by said conveying means.

10. An image forming apparatus for forming superimposed image according to claim 5, wherein the first image forming control means controls at least one of said conveying means and said plurality of image forming means based on the execution of said first mark forming control means, the detection means and the correction amount set-up means when the power source is turned ON and during the initializing operation.

11. An image forming apparatus for forming superimposed image according to claim 5, wherein the first image forming control means controls at least one of said conveying means and said plurality of image forming means based on the execution of said first mark forming control means, the detection means and the correction amount set-up means during the reset operation of the image forming apparatus after processing the image receiving medium jam.

12. An image forming apparatus for forming superimposed images according to claim 9, said second mark forming control means controls said image forming means so as to form said second mark after transferring images on said image carriers on an image receiving medium conveyed by said conveying means.

13. An image forming apparatus for forming superimposed images including a plurality of image carriers arranged along the first direction; conveying means for conveying an image receiving medium along said plurality of image carriers; a plurality of image forming means for transferring images formed on said plurality of image carriers on the image receiving medium conveyed by said conveying means; first mark forming control means for controlling said image forming means so as to form a plurality of first marks on said conveying means by said plurality of image forming means; detection means for detecting a first misregistration of images formed by said plurality of image forming means in the first direction and a second direction orthogonal to the first direction by detecting locations of the plurality of first marks formed on said conveying means; in said image forming apparatus, a method for correcting a misregistration of said plurality of images comprising the steps of:
  controlling at least one of said conveying means and said plurality of image forming means according to the first misregistration detected by said detection means;
  controlling said image forming means so as to form a second mark simpler than the first marks on said conveying means by one of said plurality of image forming means;
  detecting a second misregistration of the second mark in either the first direction or the second direction; and
  controlling at least one of said conveying means and said plurality of image forming means according to the second misregistration.

14. A method according to claim 13, wherein each of the first marks is a wedge shaped mark formed by a first straight line extending in the second direction orthogonal to said first direction and a second straight line that is not in parallel with the first straight line and is crossing the first straight line at a specified angle.

15. A method according to claim 13, wherein the second mark is a single straight line extending in the second direction orthogonal to said first direction.

16. A method according to claim 15, wherein the step of controlling said image forming means so as to form a second mark includes forming the second mark between a preceding image receiving medium and a succeeding next image receiving medium continuously conveyed by said conveying means.

17. An image forming apparatus for forming superimposed images including a plurality of image carriers arranged along the first direction; conveying means for conveying an image receiving medium along said plurality of image carriers; a plurality of image forming means for transferring images formed on said plurality of image carriers on the image receiving medium conveyed by said conveying means; first mark forming control means for controlling said image forming means so as to form a plurality of first marks on said conveying means by said plurality of image forming means; detection means for detecting a first misregistration of images formed by said plurality of image forming means in the first direction and a second direction orthogonal to the first direction by detecting locations of the plurality of first marks formed on said conveying means; in said image forming apparatus, a method for correcting a misregistration of said plurality of images comprising the steps of:

setting up a correction amount to correct the misregistration detected by said detection means;

controlling at least one of said conveying means and said plurality of image forming means based on the correction amount set up in said setting up step;

controlling said image forming means so as to form a second mark differing from said first mark by one of said plurality of image forming means; and changing the correction amount set up in said setting up step based on an amount of misregistration from a reference time by comparing a time required for forming said second mark on said conveying means in said step of the controlling said image forming means to form the second mark until the second mark is conveyed to a specified location with said reference time.

18. A method according to claim 17, wherein said the step of the controlling said image forming means to form the second mark controls to change a correction amount relative to the moving speed of said conveying means out of the correction amounts set up in said setting up step.

19. An adjusting method of superimposed images in an image forming apparatus, comprising the steps of:

conveying an image receiving medium along a plurality of image carrier by a conveying means;

transferring images formed on said plurality of image carriers onto the image receiving medium conveyed in said conveying step;

first forming a plurality of first marks on said conveying means;

first detecting a first misregistration of the first marks on said conveying means in a first direction and a second direction orthogonal to the first direction;

first controlling said conveying means according to the first misregistration detected in said first detecting step;

second forming a second mark simpler than the first marks on said conveying means;

second detecting a second misregistration of the second mark in at least one of the first direction and the second direction; and second controlling said conveying means according to the second misregistration detected in said second detecting step.

20. A method according to claim 19, wherein each of the first marks is a wedge shaped mark formed by a first straight line extending in the second direction orthogonal to said first direction and a second straight line that is not in parallel with the first straight line and is crossing the first straight line at a specified angle.

21. A method according to claim 19, wherein the second mark is a single straight line extending in the second direction orthogonal to said first direction.

22. An image forming apparatus for forming superimposed images according to claim 21, wherein said second mark forming step including a controlling to form said second mark on the conveying means between a preceding image receiving medium and a succeeding next image receiving medium continuously conveyed by said conveying means.

23. An image forming method for forming a specific image by superposing plural images formed by plural image forming units on an image receiving medium that is conveyed by conveying means in an image forming apparatus equipped with the plural image forming units and the conveying means for conveying the image receiving medium to the plural image forming units, comprising the steps of:

forming a first mark on the conveying means by the plural image forming units, said first mark formed for correcting the superposition of images in the conveying direction of the conveying means and formed in a direction orthogonal to a conveying direction;

detecting the first mark formed in the first mark forming step;

setting a correction amount for correcting the image forming operation by the plural image forming units or the conveying operation by the conveying means on the basis of the detection result in said first mark detecting step;

forming a specific image on the image receiving medium with a correction of the operation of the plural image forming units or the operation of the conveying means on the basis of the correction amount set in said setting step;

forming a second mark differing from the first mark on the conveying means by at least one of the plural image forming units, the second mark formed for correcting a superposing location of images in the direction of either the conveying direction of the conveying means or the direction orthogonal to the conveying direction, the second mark being formed in a simpler shape than that of the first mark;

detecting the second mark formed in said second mark forming step; and further adjusting the correction amount set in said setting step on the basis of the detection result in said second mark detecting step.

24. A method according to claim 23, wherein the first mark is a wedge shaped mark formed by a first straight line extending in the direction orthogonal to the conveying direction of the image receiving medium and a second straight line that is not in parallel with the first straight line and crosses the first straight line at a specified angle.

25. A method according to claim 1, wherein the second mark is a single straight line extending in the direction orthogonal to the conveying direction of the image receiving medium.

26. A method according to claim 25, wherein the second mark is formed between a preceding image receiving medium and a succeeding next image receiving medium continuously conveyed by the conveying means.

27. An image forming apparatus for forming superimposed images, comprising:

- a plurality of image carriers arranged along a first direction;
- a conveying mechanism that conveys an image receiving medium along said plurality of image carriers;
- a plurality of image forming units that transfer images formed on said plurality of image carriers onto the image receiving medium conveyed by the conveying mechanism;
- a controller that controls the image forming units to form a plurality of first marks on said conveying mechanism by said plurality of image forming units; and
- sensors that detect a first misregistration of images formed by said plurality of image forming units in the first direction and a second direction orthogonal to the first direction by detecting locations of the plurality of first marks formed on said conveying mechanism;
- wherein the controller controls at least one of said conveying mechanism and said plurality of image forming units according to the first misregistration detected by the sensors;
- wherein the controller controls the image forming units to form a second mark simpler than the first mark on said conveying mechanism by one of said plurality of image forming units; and
- wherein the sensors detect a second misregistration of the second mark in either one of the first direction or the second direction so that the controller controls one of the conveying mechanism and the plurality of image forming units according to the second misregistration.

* * * * *